US008290800B2

(12) United States Patent
Law et al.

(10) Patent No.: US 8,290,800 B2
(45) Date of Patent: Oct. 16, 2012

(54) PROBABILISTIC INFERENCE OF SITE DEMOGRAPHICS FROM AGGREGATE USER INTERNET USAGE AND SOURCE DEMOGRAPHIC INFORMATION

(75) Inventors: Ching Law, Los Angeles, CA (US);
Gokul Rajaram, Los Altos, CA (US);
Rama Ranganath, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1390 days.

(21) Appl. No.: 11/699,745

(22) Filed: Jan. 30, 2007

(65) Prior Publication Data

US 2008/0183556 A1 Jul. 31, 2008

(51) Int. Cl.
*G06Q 10/00* (2012.01)
(52) U.S. Cl. ........................................ 705/7.11; 705/1.1
(58) Field of Classification Search ................. 705/7.11, 705/1.1
See application file for complete search history.

(56) References Cited

U.S. PATENT DOCUMENTS

| | | | |
|---|---|---|---|
| 6,327,574 B1* | 12/2001 | Kramer et al. ............. | 705/14.66 |
| 2001/0013009 A1 | 8/2001 | Greening et al. | |
| 2001/0049620 A1* | 12/2001 | Blasko ............................ | 705/10 |
| 2002/0152117 A1* | 10/2002 | Cristofalo et al. .............. | 705/14 |
| 2003/0055759 A1 | 3/2003 | Conkwright et al. | |
| 2003/0101024 A1 | 5/2003 | Adar et al. | |
| 2004/0205157 A1* | 10/2004 | Bibelnieks et al. ........... | 709/218 |
| 2005/0021965 A1* | 1/2005 | Van Horn ...................... | 713/176 |
| 2005/0131762 A1 | 6/2005 | Bharat et al. | |
| 2006/0242147 A1* | 10/2006 | Gehrking et al. ................ | 707/7 |
| 2007/0180469 A1* | 8/2007 | Finley et al. .................... | 725/46 |
| 2008/0183557 A1 | 7/2008 | Law et al. | |

FOREIGN PATENT DOCUMENTS

EP 1450284 8/2004

OTHER PUBLICATIONS

PCT/ISA/220, "Notification of Transmittal of the International Search Report and the Written Opinion of the International Searching Authority, or the Declaration" for PCT/US2008/052515, mailed Jun. 27, 2008 (1 pg.).
PCT/ISA/210, "International Search Report" for PCT/US2008/052515, mailed Jun. 27, 2008 (4 pgs.).
PCT/ISA/237, "Written Opinion of the International Searching Authority" for PCT/US2008/052515, mailed Jun. 27, 2008 (5 pgs.).

* cited by examiner

*Primary Examiner* — Thomas Mansfield
(74) *Attorney, Agent, or Firm* — Straub & Pokotylo; John C. Pokotylo

(57) ABSTRACT

A demographic attribute value of a sink online document (such as Websites or Web pages) may be determined given a set of users who have visited at least one of the source documents and the sink document, by (a) accepting a value(s) of the demographic attribute, each of which values is associated with a source online document (where each of the source online documents has a value for the demographic attribute and has been visited by at least one user of the given set), (b) determining an estimate of the demographic attribute value of each of the users of the given set using the accepted demographic attribute value of each of the source online documents visited by the user, and (c) determining the demographic attribute value of the sink online document using the determined estimate of the demographic attribute value of each of the users of the given set.

17 Claims, 4 Drawing Sheets

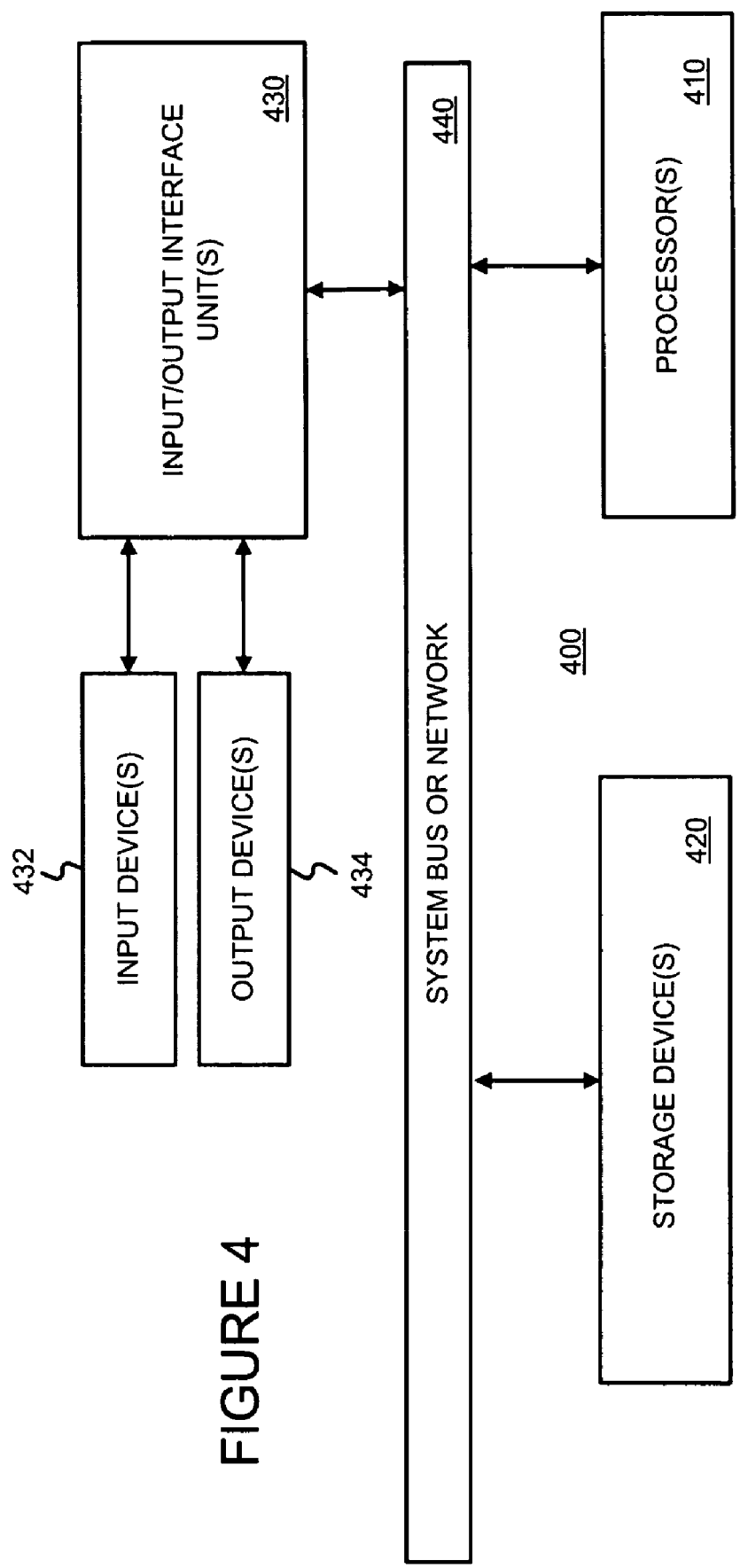

PROBABILISTIC INFERENCE OF SITE DEMOGRAPHICS FROM AGGREGATE USER INTERNET USAGE AND SOURCE DEMOGRAPHIC INFORMATION

§1. BACKGROUND OF THE INVENTION

§1.1 Field of the Invention

The present invention concerns determining demographic information. In particular, the present invention concerns probabilistically determining demographic information for a domain, such as a Website for example.

§1.2 Background Information

Demographic targeting is an important mode of targeting used by advertisers. Currently, demographic information is typically only available for large Websites on the Internet. This is likely because the third parties that supply demographic information do so using a panel of 50,000-100,000 users. Consequently, these third parties can only get statistically significant user data for large Websites. This means that there is no way for these third parties to infer the user demographics for the vast majority of Websites on the Internet. This is unfortunate, because having reliable Internet-wide demographics, would enable more advertising revenue to become available to smaller Websites, instead of just the large ones for which demographics are known.

Naturally, small Websites could self-describe their demographics. However, advertisers would probably not trust data supplied directly by the Website owner. For example, Website owners have an incentive to say "My visitors are all spendthrift millionaires", whether or not this is true, in order to attract high-revenue advertisements.

§2. SUMMARY OF THE INVENTION

Embodiments consistent with the present invention may be used to determine a demographic attribute value of a sink online document given a set of users each of whom visited at least one of the source documents and the sink document. At least some of these embodiments may do so by (a) accepting a set of one or more values of the demographic attribute, each of the one or more demographic attribute values being associated with a source online document, wherein each of the source online documents has a value for the demographic attribute and has been visited by at least one user of the given set, (b) determining an estimate of the demographic attribute value of each of the users of the given set using the accepted demographic attribute value of each of the source online documents visited by the user, and (c) determining the demographic attribute value of the sink online document using the determined estimate of the demographic attribute value of each of the users of the given set.

In at least some embodiments consistent with the present invention, the documents are Web pages, or Websites.

§3. BRIEF DESCRIPTION OF THE DRAWINGS

FIG. 4 is a block diagram of an exemplary apparatus that may perform various operations, and store information used and/or generated by such operations, in a manner consistent with the present invention.

§4. DETAILED DESCRIPTION

The present invention may involve novel methods, apparatus, message formats, and/or data structures for determining demographic information of a Website by using a set of source Websites with known demographic information and a given set of users each of whom visited at least one of the source Websites and the Website. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. In the following, "information" may refer to the actual information, or a pointer to, identifier of, or location of such information. Thus, the present invention is not intended to be limited to the embodiments shown and the inventors regard their invention to include any patentable subject matter described.

In the following, exemplary environments in which, or with which, exemplary embodiments consistent with the present invention may operate, are described in §4.1. Then, exemplary embodiments consistent with the present invention are described in §4.2. Some illustrative examples of exemplary operations of exemplary embodiments consistent with the present invention are provided in §4.3. Finally, some conclusions regarding the present invention are set forth in §4.4.

Figure 1:
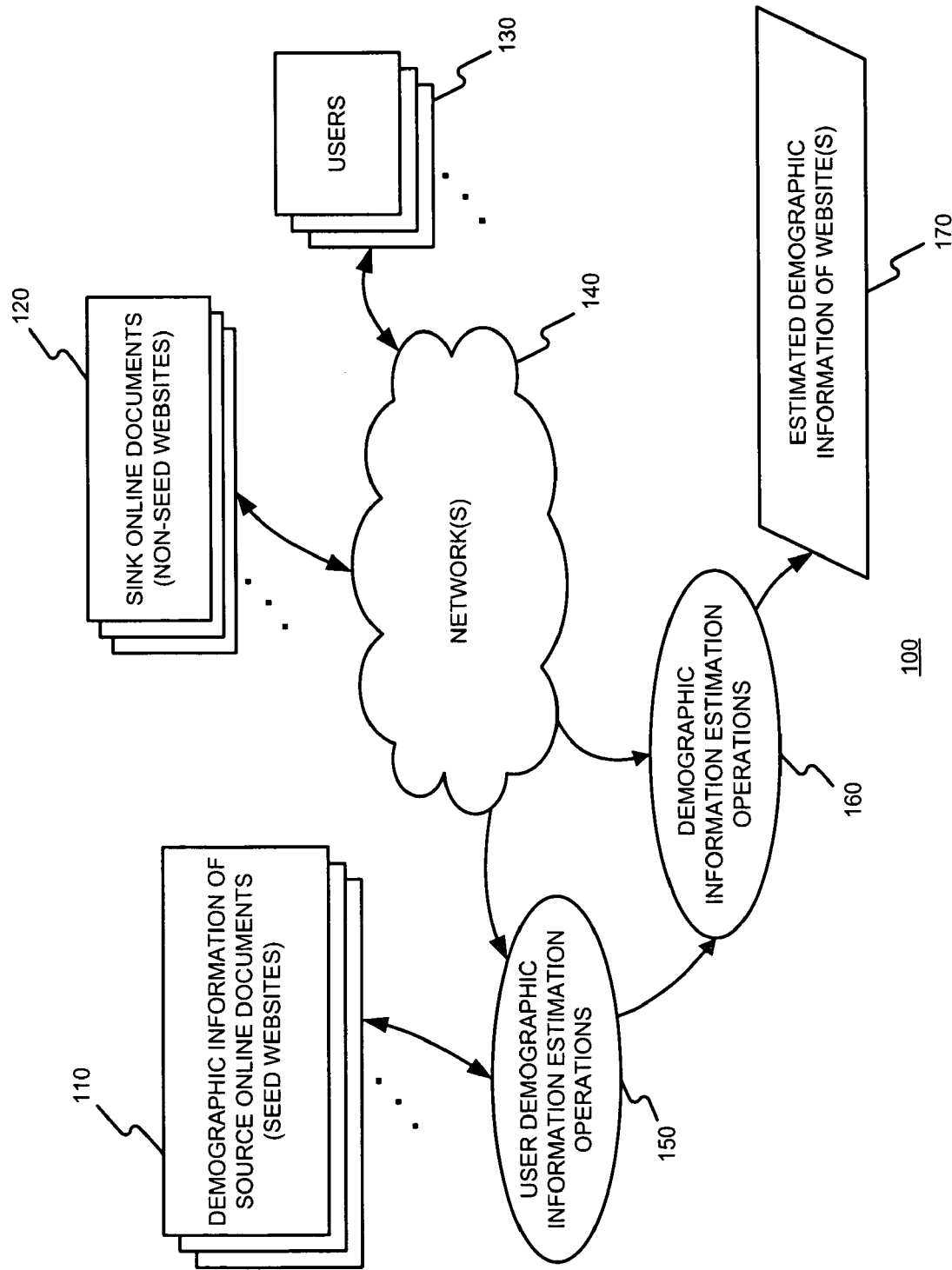
FIG. 1 is a bubble diagram illustrating various operations that may be performed, and various information that may be used and/or generated, by exemplary embodiments consistent with the present invention.

§4.1 Exemplary Environment in which, or with which, Exemplary Embodiments Consistent with the Present Invention May Operate FIG. 1 is a bubble diagram illustrating various operations that may be performed, and various information that may be used and/or generated, by exemplary embodiments consistent with the present invention. In particular, demographic information of source online documents (seed websites) 110 may be available to the user demographic information estimation operation 150. Further, the 150 operations may obtain user information from user's 130 client device (e.g., browser toolbar). Such user information may be used to draw a given set of users, each of whom visited at least one of the source online documents and sink online documents. Such user information may be generated by tracking users moving across various Websites (both source (seed) Websites 110 and sink (non-seed) Websites 120) with the help of browser toolbar. Using such a given set of users and exact demographic information of source Websites 110, the operations 150 may estimate user demographic information for all users in the given set of users defined above. The estimated demographic information of each user in the given set generated by the operations 150 may be provided to the demographic information estimation operations 160. The operations 160 may use the estimated demographic information of each user within the given set to determine estimated demographic information 170 of sink online documents 120. Various exemplary embodiments of the present invention are now described in §4.2.

§4.2 Exemplary Embodiments

Figure 2:
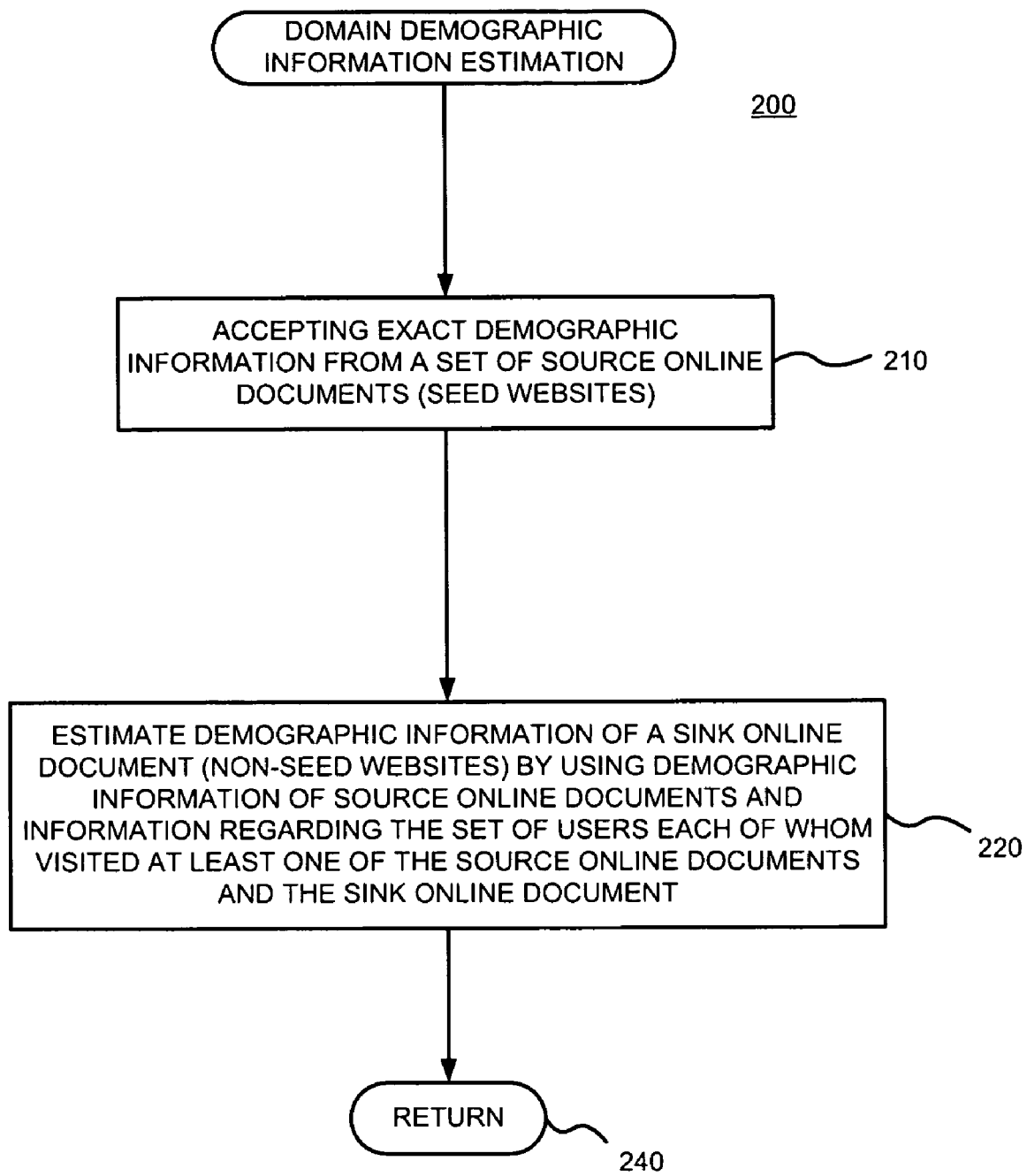
FIG. 2 is a flow diagram of an exemplary method for performing the general operations for estimating demographic information of a Website in a manner consistent with the present invention.

FIG. 2 is a flow diagram of an exemplary method 200 that might be used to probabilistically estimate demographic information of a domain or Website in a manner consistent with the present invention. In particular, the method 200 may accept exact demographic information from a set of source online documents (e.g., seed Websites). (Block 210) Thereafter, the method 200 may probabilistically estimate demographic information of sink online documents (e.g., non-seed Websites) by using demographic information of source online documents and the pair-wise relationship between the documents (both sink and source online documents). (Block 220)

Referring back to block 220, the method 200 might probabilistically estimate demographic information as follows. Let d be a demographics attribute, which is a function a set of Websites to a probability. Thus $d(s) \in [0,1]$ for any Website s. In particular, d(s) is considered as the minimum probability that a pageview on Website s would satisfy this demographics attribute (i.e., that the pageview would be by a user with the demographic attribute). For example, if d is the attribute "age 25-34", then d(site.com)=0.5 means that a pageview on site-.com has a minimum probability of 0.5 of being generated from a visitor of age 25-34.

Assume that the function d is only known for a set of source Websites S which is a subset of the universe of all Websites G. Embodiments consistent with the present invention might be used to estimate the values of d on other Websites.

In the following, two alternative approaches for estimating the demographics function d—Upstream/Downstream Traffic, and Users Demographics—are described.

§4.2.1 Upstream/Downstream Traffic Approach

In the Upstream/Downstream Traffic approach, pair-wise relations between Websites are examined by tracking the users who move across the Websites during their browsing sessions.

Let p be a function on set of edges of the graph G, where nodes of the graph G represent domains (e.g., Websites) or Web pages. For any two Websites a and b, let p(a,b) represent the probability that a pageview at Website b is initiated by a visitor of Website a. Function p can be derived from information tracking users who have visited Website a and/or Website b. Such information may be recorded in toolbar traffics logs. For example, if p(aa.com, bb.com)=0.1, then a pageview on bb.com has the probability of 0.1 that it is generated by a visitor of site aa.com.

Some embodiments consistent with the present invention might use a damping factor $\alpha \in (0,1)$ to express how dependent or independent the traffic is of the demographics property. Specifically, if the traffic data is independent of the demographics property, then α would be 1 (1 means no damping factor at all, which is the case when the traffic data is independent of demographics). Otherwise a would be a factor less than 1 indicating some preservation of demographics property in the traffic flow. A reasonable value for α can be derived by observing the demographics of source Websites for which there is traffic data. For example, if only users of a certain demographics property move from Website A to Website B, and if users without this property would move to Website C, then a might be set close to zero for this particular property.

For each site t≠s, a lower-bound estimate of the demographics d on t as contributed by s can be determined as follows:

$$p(s,t) \times d(s) \times \alpha$$

Repeating this calculation for all pairs s, t an estimate of e(t) can be expressed as:

$$e(t) = \alpha \sum_{S \in G} p(s, t) d(s).$$

This can be repeated, using e as function d in the next iteration (e.g., until the estimate is not further improved).

One potential disadvantage of the upstream/downstream traffic approach is that it might depend on the direct clicks between Websites to infer the demographics information. However, a Website's demographics from all the upstream and downstream traffic could deviate from its overall demographics. Notwithstanding such a potential deviation, if it can be assumed that such click traffic should be mostly independent of the overall demographics, then this approach should provide useful estimates.

§4.2.2 Users Demographics Approach

In the users demographics approach, demographics information of a user is inferred from the Websites that they visit (e.g., using client device browser toolbar information). For example, if a user u visits a Website s with d(s)=0.7, then a value 0.7 can be assigned to d(u). If u visits two independent Websites a and b, d(u) can be estimated to be (1−d(a))(1−d(b)). However, in general, it is not easy to show that the demographics of two Websites are independent. Further, given the fact that u visits both Websites, they cannot be assumed to be totally independent.

A simpler approach is to take the average of d(s) for all Websites s∈S visited by u. Let v be the visiting function where v(u, s)=1 if user u visits Website s, and v(u,s)=0 otherwise. Thus, all Websites visited by u may be expressed as $S_u = \{u \in S | v(u,s)=1\}$. The estimated value of the demographic for the user can be expressed as:

$$e(u) = \frac{\sum_{s \in S_u} d(s)}{|S_u|}.$$

This would be an estimation of the demographics of user u. Then, for any Website t not in S (Note that S is the set of all Websites for which there is demographics information from external source, and it is desired to estimate the demographics function of Websites not in S.), the value of the demographic attribute for the Website t may be estimated as the average value of d(u) for all visitors u∈U of Website t:

$$e(t) = \frac{\sum_{u \in U_t} e(u)}{|U_t|},$$

where $U_t = \{u \in U | v(u,t) = 1\}$.

Thus, the users demographics approach can work with either pageviews or unique users. The above formula estimates the demographics of a random visitor of Website t. If frequency estimates of the visitors of Website t are also available, then the demographics of a random pageview at the Website t can also be estimated.

§4.2.3 Evaluation

To evaluate the either of the foregoing approaches, given a Website s in the source set S, the demographics of the Website s can be estimated with either of foregoing techniques. The estimate may then be compared with the given (actual) value d(s). In some conservative embodiments consistent with the present invention, the estimates should not exceed the provided d(s) values for most of the Websites in S.

§4.2.4 Exemplary Methods

Figure 3:
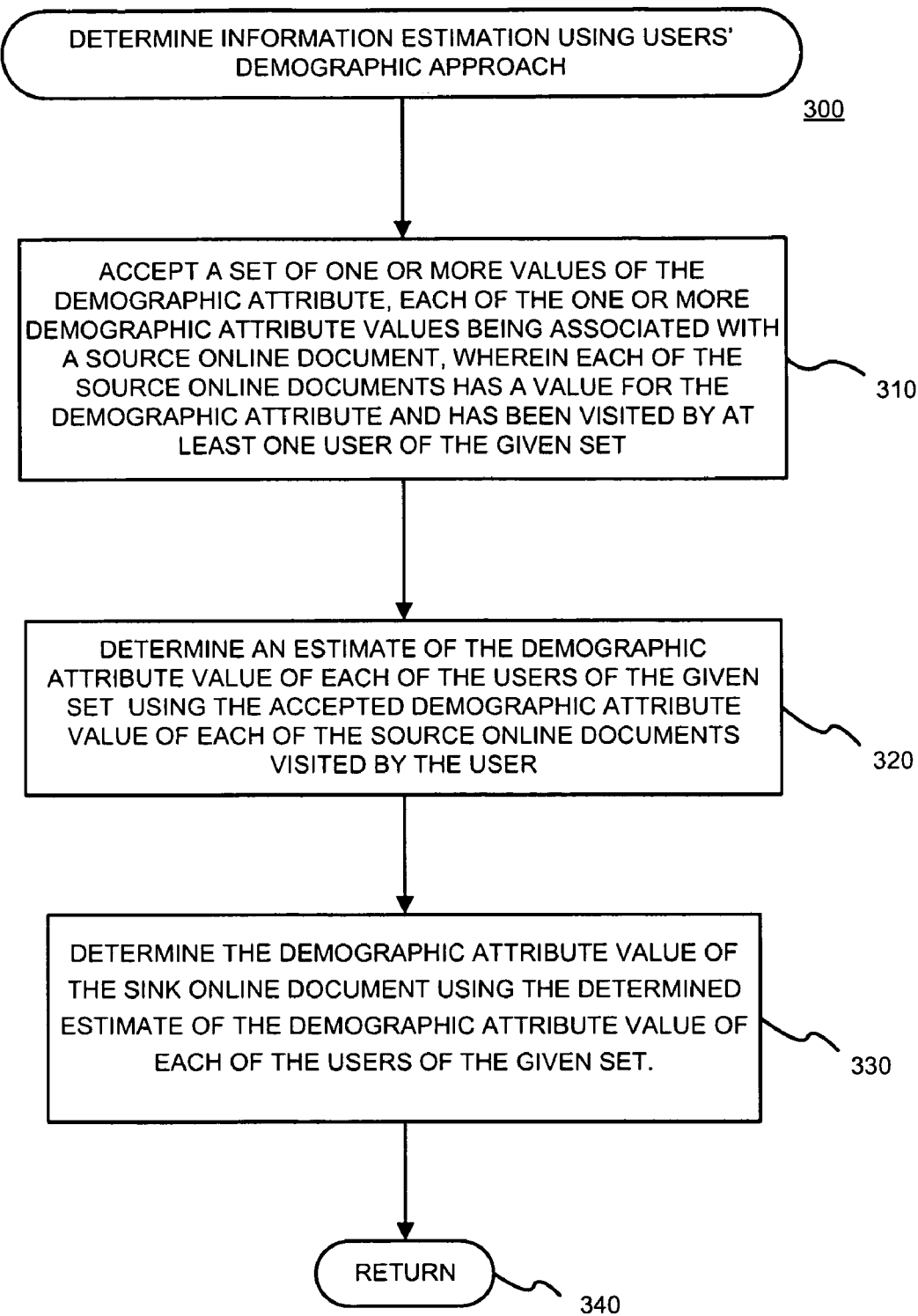
FIG. 3 is a flow diagram of an exemplary method for estimating demographic information of a Website in a manner consistent with the present invention.

FIG. 3 is a flow diagram of an exemplary method 300 that may be used to estimate demographic information of a document (referred to as a "Sink online document") such as a domain or Website for example, in a manner consistent with the present invention. In particular, the method 300 may accept a set of one or more values of the demographic attribute, each of which being associated with a source online document, wherein each of the source online documents has a value for the demographic attribute and has been visited by at least one user of a set of users who have also visited a sink document. (Block 310) The method 300 may determine an estimate of the demographic attribute value of each of the users of the given set using the accepted demographic attribute value of each of the source online documents visited by the user. (Block 320) Finally, the method 300 may determine the demographic attribute value of the sink online document using the determined estimate of the demographic attribute value of each of the users of the given set. (Block 330)

Referring back to block 310, the given set of users might be users who have visited both at least one of the source documents and the sink document. This set of users can be derived from browser toolbars which can track Websites visited by users.

Referring back to block 320, the method 300 might determine an estimate of the demographic attribute value of each of the users in the given set by (i) summing, over all the source online documents visited by the user, the corresponding demographic attribute value of the source online documents to generate a summing result, and (ii) dividing the summing result with the number of source online documents visited by the user.

Referring back to block 330, the method 300 may determine the demographic attribute value of the sink online document by (i) summing, over all the users of the given set, the corresponding determined estimate of the demographic attribute value of each of the users to generate a summing result, and (ii) dividing the summing result with the number of users of the given set.

§4.2.5 Exemplary Apparatus

FIG. 4 is high-level block diagram of a machine 400 that may perform one or more of the operations discussed above.

The machine 400 basically includes one or more processors 410, one or more input/output interface units 430, one or more storage devices 420, and one or more system buses and/or networks 440 for facilitating the communication of information among the coupled elements. One or more input devices 432 and one or more output devices 434 may be coupled with the one or more input/output interfaces 430. The machine 400 may be, for example, an advertising server, or it may be a plurality of servers distributed over a network.

The one or more processors 410 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 420 and/or may be received from an external source via one or more input interface units 430. The machine-executable instructions might be stored as modules (e.g., corresponding to the above-described operations).

In one embodiment consistent with the present invention, the machine 400 may be one or more conventional personal computers. In this case, the processing units 410 may be one or more microprocessors. The bus 440 may include a system bus. The storage devices 420 may include system memory, such as read only memory (ROM) and/or random access memory (RAM). The storage devices 420 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 432, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 410 through an appropriate interface 430 coupled to the system bus 440. The output devices 434 may include a monitor or other type of display device, which may also be connected to the system bus 440 via an appropriate interface. In addition to (or instead of) the monitor, the personal computer may include other (peripheral) output devices (not shown), such as speakers and printers for example.

Referring back to claim 1, the online documents might be documents served by server computers. The users 130 might access the online documents using a client device, such as a personal computer, a mobile telephone, a mobile device, etc., having a browser. The operations 150 and 160 might be performed by one or more computers.

§4.2.6 Refinements and Alternatives

The source demographic attribute information might be exact or non-exact demographic information of a small set of large Websites. This information might be collected from the Internet surfing behavior of opted-in panelists (e.g., 50,000-100,000 in number) whose exact demographics are known. For each Website in this list, the information supplied might include one or more of the following demographic information: Age, Gender, Household Income, Education, # Children (Household size), Connection speed, etc. Thus, this data might be used as "seed" data.

The surfing behavior of an extremely large number (e.g., millions) of users might be analyzed to compute user traffic inflows and outflows for every Website. This data might be obtained from client software (e.g., a browser toolbar) installed on users' computers.

Although some of the exemplary embodiments were discussed in the context of Websites, embodiments consistent with the present invention might be used to infer demographic information in other contexts such as, for example, domains, Web pages, documents, etc.

§4.3 Examples of Operations

To illustrate the above operations of an exemplary method, a simplified example is presented. Assume that the universe of all Websites is $G=\{S_1, S_2, S_3, S_4\}$ and the seed Websites which is a subset of G is the following: $S=\{S_2, S_3\}$. Demographic information for the seed Websites is known. The following is a sample of some demographic information for the two seed Websites $S_2$ and $S_3$.

| Demographic property | Website $S_2$ | Website $S_3$ |
|---|---|---|
| Age (20-35) | 80% | 60% |
| Age (36-60) | 20% | 40% |
| Gender M | 85% | 75% |
| Gender F | 15% | 25% |
| Household income ($70K-$100K) | 10% | 45% |

Assume that d(S) is the demographic property that "users are male". Then, it is known from the table above that $d(S_2)=0.85$ and $d(S_3)=0.75$. The objective is to probabilistically estimate $d(S_1)$ and $d(S_4)$.

In particular, this approach estimates the demographic properties of each single user and subsequently determines the demographic properties of each non-seed Website.

Again, assume that the universe of all Websites is $G=\{S_1, S_2, S_3, S_4\}$ and the seed Websites which is a subset of G is $S=\{S_2, S_3\}$. Demographic information for the seed Websites are as described above. Further, it is assumed that the universe of all users is $U=\{u_1, u_2, u_3, u_4, u_5\}$.

The first step in this approach is to estimate the demographic property d(u) of user u. A simple approach is to take the average of d(S) for all seed Websites visited by u which can be represented by the following equation:

$$e(u) = \frac{\sum_{s \in S_u} d(s)}{|S_u|}.$$

$S_u$ is the set of seed Websites visited by user u. Assume that the set of seed Websites visited by each user in the user set $U=\{u_1, u_2, u_3, u_4, u_5\}$ are the following:
$S_{u_1}=\{S_2, S_3\}, S_{u_2}=\{S_3\}, S_{u_3}=\{S_2, S_3\}, S_{u_4}=\{S_2\}, S_{u_5}=\{S_2\}$.
Now the above equation may be used to estimate the average demographic property for each user:

For user $u_1$:

$$e(u_1) = \frac{d(S_2) + d(S_3)}{|S_{u_1}|} = \frac{0.85 + 0.75}{2} = 0.80$$

For user $u_2$:

$$e(u_2) = \frac{d(S_3)}{|S_{u_2}|} = \frac{0.75}{1} = 0.75$$

For user $u_3$:

$$e(u_3) = \frac{d(S_2) + d(S_3)}{|S_{u_3}|} = \frac{0.85 + 0.75}{2} = 0.80$$

For user $u_4$:

$$e(u_4) = \frac{d(S_2)}{|S_{u_4}|} = \frac{0.85}{1} = 0.85$$

For user $u_5$:

$$e(u_5) = \frac{d(S_2)}{|S_{u_5}|} = \frac{0.85}{1} = 0.85$$

The above results are estimates of the demographic property that "users are male" of each user. The next step is to take the average value of d(u) (or e(u)) for each non-seed Website "t" for all users that visited site "t":

$$e(t) = \frac{\sum_{u \in U_t} e(u)}{|U_t|}.$$

$U_t$ is the set of users that visited non-seed site "t". Assume that the set of user that visited each of the non-seed Website are the following: $U_{s_1}=\{u_1, u_2, u_3, u_5\}$, $U_{s_2}=\{u_1, u_3, u_4, u_5\}$, $U_{s_3}=\{u_1, u_2, u_3\}$, $U_{s_4}=\{u_1, u_2\}$. Now the above equation may be used to estimate the demographic property of "users are male" for every non-seed Website:

For Website $S_1$:

$$e(S_1) = \frac{\sum_{u \in U_{S_1}} e(u)}{|U_{S_1}|} = \frac{e(u_1) + e(u_2) + e(u_3) + e(u_5)}{4} = \frac{0.80 + 0.75 + 0.80 + 0.85}{4} = 0.80$$

For Website $S_4$:

$$e(S_4) = \frac{\sum_{u \in U_{S_4}} e(u)}{|U_{S_4}|} = \frac{e(u_1) + e(u_2)}{2} = \frac{0.80 + 0.75}{2} = 0.78$$

From the above the final results are:

$d(S_1)=0.80$, $d(S_2)=0.85$, $d(S_3)=0.75$, and $d(S_4)=0.78$

As a result, it has now been estimated probabilistically that 80% of users visiting Website $S_1$ are male and 78% of users visiting Website $S_4$ are male.

It is possible to probabilistically estimate any other demographic property (e.g., Ages 20-35, Age 36-60, Household Income $70k-$100k, etc.) for Websites $S_1$ and $S_4$ in a similar manner.

§4.4 Conclusions

As can be appreciated from the foregoing, embodiments consistent with the present invention may be used to provide useful estimates of demographic information for domains, such as Websites for example.

What is claimed is:

1. A computer-implemented method for determining an estimated demographic attribute value of a first online document given a set of independent users each of whom visited at least one of a plurality of second online documents and the first online document, the method comprising:
   a) accepting, by a computer system including at least one computer, a set of one or more known values of a demographic attribute, each of the one or more known demographic attribute values being associated with each of the plurality of second online documents, wherein each of the plurality of second online documents has a known value for the demographic attribute and has been visited by at least one user of the given set;
   b) determining, by the computer system, an estimate of the demographic attribute value of each of the independent users of the given set using the accepted known demographic attribute value of each of the plurality of second online documents visited by the user;
   c) determining, by the computer system, the estimated demographic attribute value of the first online document using the determined estimate of the demographic attribute value of all of the independent users of the given set; and
   d) associating, by the computer system, the demographic attribute and its determined estimated demographic attribute value with the first online document,
   wherein each of the plurality of second online documents is one of (A) a Website for which the demographic attribute value of the demographic attribute is known, or (B) a Web page for which the demographic attribute value of the demographic attribute is known, and
   wherein the first online document is one of (A) a Website for which the estimated demographic attribute value of the demographic attribute is determined, or (B) a Web page for which the estimated demographic attribute value of the demographic attribute is determined.

2. The computer-implemented method of claim 1 wherein the act of determining an estimate of the demographic attribute value of each of the independent users includes (i) summing over all the second online documents visited by the user, the corresponding demographic attribute value of each of the plurality of second online documents to generate a summing result, and (ii) dividing the summing result with the number of second online documents visited by the user.

3. The computer-implemented method of claim 2 wherein the act of determining the estimated demographic attribute value of the first online document includes (i) summing over all the independent users of the given set, the corresponding determined estimate of the demographic attribute value of each of the independent users to generate a summing result, and (ii) dividing the summing result with the number of independent users of the given set.

4. The computer-implemented method of claim 1 wherein the act of determining the estimated demographic attribute value of the first online document includes (i) summing over all the independent users of the given set, the corresponding determined estimate of the demographic attribute value of each of the users to generate a summing result, and (ii) dividing the summing result with the number of independent users of the given set.

5. The computer-implemented method of claim 1 wherein the first online document does not initially have a value for the demographic attribute.

6. Apparatus for determining an estimated demographic attribute value of a first online document given a set of independent users each of whom visited at least one of a plurality of second online documents and the first online document, the apparatus comprising:
   a) at least one processor;
   b) an input device; and
   c) at least one storage device storing a computer executable code which, when executed by the at least one processor, performs a method of
      1) accepting a set of one or more known values of a demographic attribute, each of the one or more known demographic attribute values being associated with each of the plurality of second online documents, wherein each of the plurality of second online documents has a known value for the demographic attribute and has been visited by at least one user of the given set;
      2) determining an estimate of the demographic attribute value of each of the independent users of the given set using the accepted known demographic attribute value of each of the plurality of the second online documents visited by the user;
      3) determining the estimated demographic attribute value of the first online document using the determined estimate of the demographic attribute value of all of the independent users of the given set; and
      4) associating the demographic attribute and its determined estimated demographic attribute value with the first online document,
      wherein each of the plurality of second online documents is one of (A) a Website for which the demographic attribute value of the demographic attribute is known, or (B) a Web page for which the demographic attribute value of the demographic attribute is known, and
      wherein the first online document is one of (A) a Website for which the estimated demographic attribute value of the demographic attribute is determined, or (B) a Web page for which the estimated demographic attribute value of the demographic attribute is determined.

7. The apparatus of claim 6 wherein the act of determining an estimate of the demographic attribute value of each of the independent users includes (i) summing over all the second online documents visited by the user, the corresponding demographic attribute value of each of the plurality of second online documents to generate a summing result, and (ii) dividing the summing result with the number of second online documents visited by the user.

8. The apparatus of claim 7 wherein the act of determining the estimated demographic attribute value of the first online document includes (i) summing over all the independent users of the given set, the corresponding determined estimate of the demographic attribute value of each of the independent users to generate a summing result, and (ii) dividing the summing result with the number of independent users of the given set.

9. The apparatus of claim 6 wherein the act of determining the estimated demographic attribute value of the first online document includes (i) summing over all the users of the given set, the corresponding determined estimate of the demographic attribute value of each of the users to generate a summing result, and (ii) dividing the summing result with the number of users of the given set.

10. The apparatus of claim 6 wherein the first online document does not initially have a value for the demographic attribute.

11. Apparatus for determining an estimated demographic attribute value of a first online document given a set of independent users each of whom visited at least one of a plurality of second online documents and the first online document, the apparatus comprising:

a) a network-based server module for accepting a set of one or more known values of a demographic attribute, each of the one or more known demographic attribute values being associated with each of the plurality of second online documents, wherein each of the plurality of second online documents has a known value for the demographic attribute and has been visited by at least one user of the given set;

b) a network-based server module for determining an estimate of the demographic attribute value of each of the independent users of the given set using the accepted known demographic attribute value of each of the plurality of the second online documents visited by the user;

c) a network-based server module for determining the estimated demographic attribute value of the first online document using the determined estimate of the demographic attribute value of all of the independent users of the given set; and d) a network-based server module for associating the demographic attribute and its determined estimated demographic attribute value with the first online document, wherein each of the plurality of second online documents is one of (A) a website for which the demographic attribute value of the demographic attribute is known, or (B) a Web page for which the demographic attribute value of the demographic attribute is known, and wherein the first online document is one of (A) a Website for which the estimated demographic attribute value of the demographic attribute is determined, or (B) a Web page for which the estimated demographic attribute value of the demographic attribute is determined.

12. The apparatus of claim 11 wherein the network-based server modules are part of a advertising server network.

13. The apparatus of claim 11 wherein the network-based server modules are part of a distributed server network.

14. The apparatus of claim 11 wherein the network-based server module for determining an estimate of the demographic attribute value of each of the independent users includes (i) a server module for summing over all the second online documents visited by the user, the corresponding demographic attribute value of each of the plurality of second online documents to generate a summing result, and (ii) a server module for dividing the summing result with the number of second online documents visited by the user.

15. The apparatus of claim 14 wherein the network-based server module for determining the estimated demographic attribute value of the first online document includes (i) a server module for summing over all the independent users of the given set, the corresponding determined estimate of the demographic attribute value of each of the users to generate a summing result, and (ii) a server module for dividing the summing result with the number of users of the given set.

16. The apparatus of claim 11 wherein the network-based server module for determining the estimated demographic attribute value of the first online document includes (i) a server module for summing over all the independent users of the given set, the corresponding determined estimate of the demographic attribute value of each of the independent users to generate a summing result, and (ii) a server module for dividing the summing result with the number of independent users of the given set.

17. The apparatus of claim 11 wherein the first online document does not initially have a value for the demographic attribute.

* * * * *